United States Patent
Chen (10) Patent No.: US 11,163,123 B2
(45) Date of Patent: Nov. 2, 2021

(54) DUPLEX FIBER OPTIC ADAPTER

(71) Applicant: EZCONN CORPORATION, Taipei (TW)

(72) Inventor: Szu ming Chen, New Taipei (TW)

(73) Assignee: EZconn Corporation, Taipei (TW)

( * ) Notice: Subject to any disclaimer, the term of this patent is extended or adjusted under 35 U.S.C. 154(b) by 0 days.

(21) Appl. No.: 16/741,776

(22) Filed: Jan. 14, 2020

(65) Prior Publication Data
US 2021/0215890 A1    Jul. 15, 2021

(51) Int. Cl.
*G02B 6/38*    (2006.01)
(52) U.S. Cl.
CPC ......... *G02B 6/3879* (2013.01); *G02B 6/3825* (2013.01); *G02B 6/3885* (2013.01)
(58) Field of Classification Search
CPC .................................................. G02B 6/3879
See application file for complete search history.

(56) References Cited

U.S. PATENT DOCUMENTS

| 6,634,796 | B2 * | 10/2003 | de Jong | ............... | G02B 6/3831 |
| | | | | | 385/139 |
| 9,709,753 | B1 * | 7/2017 | Chang | .................... | G02B 6/387 |

* cited by examiner

*Primary Examiner* — Omar R Rojas (57) ABSTRACT

A duplex fiber optic adapter, comprising a housing having an integrated polarity reversal portion and a receiving portion is provided. The integrated polarity reversal portion comprises a first fiber optic connector assembly, including a first optic fiber assembly having a first coupling ferrule, a first connecting ferrule, and a first optic fiber therebetween, and a second fiber optic connector assembly, including a second optic fiber assembly having a second coupling ferrule, a second connecting ferrule, and a second optic fiber therebetween. The receiving portion comprises first and second ports, configured to receive a pair of ferrules of a fiber optic connector and through opposing ends, the first port is configured to receive the second connecting ferrule and the second port is configured to receive the first connecting ferrule. Following engagement, polarity reversal optical connection is established between the fiber optic connector and a mating fiber optic connector via the adapter.

18 Claims, 6 Drawing Sheets

Fig. 4

DUPLEX FIBER OPTIC ADAPTER

TECHNICAL FIELD

Example embodiments relate generally to the field of optical communications and, more particularly, to duplex fiber optic adapters.

BACKGROUND

Driven by the ever-growing computing demands of cloud users, generation of massive amounts of data by edge computing devices such as AI-enabled IoT devices, and roll-out of 5G networks, the architectures of hyperscale, colocation and on-premise data centers have rapidly evolved and new data centers closer to end-users or devices have been built as the demand for services that rely on edge data centers increase.

For data centers, whether it's new builds or network upgrades, proper cabling infrastructure is required for successful application delivery within the data centers. The cabling infrastructure must be reliable, easy to install, modular and flexible, to accommodate changes, and scalable, to support data center growth. In general, the cabling infrastructure connects the end and intermediate points of traffic patterns within the data centers to and from routers, interconnection switches, access switches, servers, SAN switches and storage. Of the types of cabling employed in data centers, fiber optic cables support high data rates for high-speed network interfaces and protocol standards.

Generally, for installation of fiber optic cables, pre-connectorized fiber optic cables may be utilized for snap fit connections. The connectors mechanically couple and align core fibers and allow for the efficient transfer of light. Generally, the connectors comprise of cables, ferrules, a connector body, and a coupling device. Of the optic fiber connectors, such as Lucent connectors (LC), square connectors (SC) and MPO connectors, LC duplex fiber optic connectors are fiber optic connectors with a pair of multimode fiber (MMF) or singlemode fiber (SMF), that transmit data in two opposite directions, one in each optical fiber. For example, a transmit signal (Tx) port and receiver (Rx) port of an LC duplex fiber optic connector should always be connected to a receiver (Rx) port and a transmit signal (Tx) port of a corresponding LC duplex fiber optic connector, respectively. Polarity is the direction of a light signal travelling through an optical fiber. As an example, LC duplex fiber optic connectors may generally be utilized for single-lane transceivers, such as 10G or 25G SFP, or for wavelength multiplexing, such as CWDM4, SWDM4 or BiDi, in the same fiber pair, and are connected using LC duplex fiber optic adapters.

An LC duplex fiber optic adapter joins and aligns the connectors of two LC duplex fiber optic cables together. An important feature for optical fiber connection is the precise alignment of each optical fiber core. The alignment is influenced by a ferrule within each connector and an alignment port within each adapter, bringing together the ferrules of the two connectors being mated within the adapter's port, and at its approximate midpoint.

With new data centers being built and existing data centers being upgraded the problem of poor fiber connection alignment and/or crossing of fiber optic cables during installation have increased. Often, there are multiple adapters and optic fiber segments connected in a data center, with the polarity of the connectors used changing not just once, but, several times during deployment. When switching of polarities is required, often, the connectors are re-terminated. However, this manual procedure is time-consuming, increases the risk of human error, and in some instances, require special tools for completion. A wrong connection, results in non-precise alignment of the optical fiber cores, signal degradation, damaged equipment or devices, or signals not being transmitted. Also, multiple changing of optic fiber polarities, wherein any manual adjustment to connectors is required, further increases the risk of non-precise alignment of the optical fiber cores. Additionally, multiple changing of optic fiber polarities, require installers to carefully inspect both sides of an adapter to assure desired polarity connection which further increases installation time. Inspection is further exasperated, when the fiber optic connectors are rotated 180° degrees and reengaged.

SUMMARY

Duplex fiber optic adapters, duplex fiber optic systems, and a method of changing a polarity connection between fiber optic connectors via a duplex fiber optic adapter are provided.

In an embodiment, a duplex fiber optic adapter, comprising a housing is provided. The housing comprises an integrated polarity reversal portion, a first fiber optic connector assembly, a second fiber optic connector assembly, and a receiving portion. The integrated polarity reversal portion comprises a first body component and a second body component fixedly attached thereto. The first and second body components form a first attachment opening and a second attachment opening. The first fiber optic connector assembly comprises a first optic fiber assembly having a first coupling ferrule, a first connecting ferrule, and a first optic fiber attached therebetween. The second fiber optic connector assembly comprises a second optic fiber assembly having a second coupling ferrule, a second connecting ferrule, and a second optic fiber attached therebetween. The first fiber optic connector assembly is engaged and fixed in the first attachment opening and the second fiber optic connector assembly is engaged and fixed in the second attachment opening.

The receiving portion has a first port and a second port positioned therewithin. The first and second ports are configured to receive a pair of ferrules of a fiber optic connector and through opposing ends, the first port is configured to receive the second connecting ferrule and the second port is configured to receive the first connecting ferrule. An optical connection is established between the pair of ferrules of the fiber optic connector and the second and first connecting ferrules, respectively. The first port is aligned and positioned on a same side as the first fiber optic connector assembly and the second port is aligned and positioned on a same side as the second fiber optic connector assembly.

When the fiber optic connector is inserted into the adapter and the first and second fiber optic connector assemblies are coupled to a mating fiber optic connector, latch clip assemblies of the fiber optic connector are engaged within the receiving portion and the pair of ferrules is engaged in the first and second ports, respectively and latch clip assemblies of the first and second fiber optic connector assemblies are engaged within the mating fiber optic connector and the first and second coupling ferrules are engaged in a pair of ports of the mating fiber optic connector, thereby establishing polarity reversal connection between the fiber optic connector and mating fiber optic connector via the adapter.

In some embodiments, the integrated polarity reversal portion further comprises a rearward guiding structure and a frontward guiding structure. The rearward guiding structure has a first rearward structure surface and a second rearward structure surface opposite therefrom, positioned and aligned centrally and off centered toward the first and second port sides. The frontward guiding structure has a first frontward structure surface and a second frontward structure surface opposite therefrom, positioned and aligned centrally and off centered toward the first and second attachment openings side. The first optic fiber curves around the first frontward structure surface and second rearward structure surface and the second optic fiber curves around the second frontward structure surface and first rearward structure surface, stabilizing and preventing kinking and entanglement of the first and second optic fibers.

In some embodiments, the integrated polarity reversal portion further comprises an internal fixing structure positioned near to the first and second ports and a proximal fixing structure integrated with the first and second attachment openings. The internal fixing structure is configured to fixedly secure and prevent movement of the second and first connecting ferrules, respectively, and the proximal fixing structure is configured to fixedly secure and prevent movement of the first and second fiber optic connector assemblies.

In some embodiments, the first and second fiber optic connector assemblies each comprise a neck flange end. Each neck flange end is configured to correspond to and be fixedly secured in the proximal fixing structure.

In some embodiments, the first and second connecting ferrules each comprise a stabilizing component fixedly attached therearound, each stabilizing component including an integrated sleeve having a distal neck and a collar positioned therebetween, whereby each stabilizing component is configured to correspond to and be fixedly secured in the internal fixing structure.

In some embed invents, the internal fixing structure comprises a first fixing component having a first stepped structure, integrated with the first body component and a second fixing component having a second stepped structure, opposing the first stepped structure, integrated with the second body component, forming a first fixing opening and a second fixing opening. The first and second connecting ferrules correspond to and are engaged and fixed in the second and first fixing openings, respectively. The first stepped structure fixedly engages with each of corresponding surfaces of the integrated sleeves and collars of the stabilizing components, respectively, and the second step structure fixedly engages with each of corresponding opposing surfaces of the collars of the stabilizing components, opposite from the first stepped structure, and from the distal neck sides of the collars, respectively, preventing x, y and z axis movement of the stabilizing component.

In some embodiments, each of corresponding surfaces of the collars and each of corresponding opposing surfaces of the collars are flat surfaces, whereby each of the corresponding surfaces rests flush on a portion of a lower step of the first stepped structure and each of the corresponding opposing surfaces rests flush on a portion of a lower step of the second stepped structure. The depth and the width of the first and second stepped structures is equal to the thicknesses of the collars from the integrated sleeves to the corresponding surfaces of the collars and corresponding opposing surfaces of the collars, respectively, and the widths of each collar, respectively, preventing rotational movement of the stabilizing component.

In some embodiments, the first and second connecting ferrules each further comprise an alignment sleeve fixedly attached to the stabilizing components, respectively, opposite the distal neck. A length of each alignment sleeve is greater than a length of each connecting ferrule extended from the stabilizing component. The portions of the alignment sleeves not encompassing each connecting ferrule, respectively, is correspondingly slide-fit engaged to an inner stop ledge in the first and second ports, respectively, stabilizing and aligning optical fiber cores of the fiber optic connector to the second and first connecting ferrules, respectively.

In some embodiments, the duplex fiber optic adapter further comprises identification labels on at least one visible outer surface thereof. The visible outer side is the side where removable trigger mechanisms are positioned, and wherein the identification labels comprise a letter B in alignment with the first port and a letter B in alignment with the second fiber optic connector assembly, a letter A in alignment with the second port and a letter A in alignment with the first fiber optic connector assembly, and an X-like polarity reversal label between the letter B and letter A in alignment with the first and second ports, respectively, and the letter A and letter B in alignment with the first and second fiber optic connector assemblies, respectively.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of heatsink fins incorporating aspects of the presently disclosed principles are illustrated by way of example, and not by way of limitation.

DETAILED DESCRIPTION

The following describes various principles related to optical communication systems by way of reference to specific examples of cabling infrastructure, including arrangements and examples of fiber optic connectors and adapters embodying innovative concepts. More particularly, but not exclusively, such innovative principles are described in relation to selected examples of fiber optic connectors and adapters and well-known functions or constructions are be described in detail for purposes of succinctness and clarity. Nonetheless, one or more of the disclosed principles can be incorporated in various other embodiments of fiber optic connectors and adapters to achieve any of a variety of desired outcomes, characteristics, and/or performance criteria.

Thus, fiber optic connectors and adapters having attributes that are different from those specific examples discussed herein can embody one or more of the innovative principles, and can be used in applications not described herein in detail. Accordingly, embodiments of fiber optic connectors and adapters not described herein in detail also fall within the scope of this disclosure, as will be appreciated by those of ordinary skill in the relevant art following a review of this disclosure.

Example embodiments as disclosed herein are directed to duplex fiber optic adapters. In an embodiment, a duplex fiber optic adapter, comprising a housing having an integrated polarity reversal portion and a receiving portion is provided. The integrated polarity reversal portion comprises a first fiber optic connector assembly, including an optic fiber assembly having a first coupling ferrule, a first connecting ferrule, and a first optic fiber attached therebetween, and a second fiber optic connector assembly, including an optic fiber assembly having a second coupling ferrule, a second connecting ferrule, and a second optic fiber attached therebetween. The receiving portion comprises first and second ports, configured to receive a pair of ferrules of a fiber optic connector and through opposing ends, the first port is configured to receive the second connecting ferrule and the second port is configured to receive the first connecting ferrule. Following engagement, polarity reversal optical connection is established between the fiber optic connector and a mating fiber optic connector via the adapter.

In some embodiments the duplex fiber optic adapters may be applicable to, as an example and not to be limiting, communications equipment and patch panels, providing physical connection to networks and devices. Generally, the connector type of the duplex fiber optic adapters of the embodiments is a duplex LC connector type. A duplex LC connector is engaged into a duplex fiber optic adapter. Those of ordinary skill in the relevant art may readily appreciate, that the duplex fiber optic adapters of the embodiments may be any even numbered port amount, as long as each LC connector comprising two opposing signals may be engaged therein, and the embodiments are not limited thereto. Those of ordinary skill in the relevant art may also readily appreciate, that the duplex fiber optic adapters of the embodiments may be stackable vertically, horizontally, or both, and secured by any bracket means known by those skilled in the relevant art or within chassis of communications equipment or panels, and the embodiments are not limited thereto.

In some embodiments, the fiber and polish types of the duplex LC connectors may be optical single mode or multimode type having varying core and cladding sizes, and PC, Ultra PC, or Angled PC polish type, respectively, and the embodiments are not limited. Generally, duplex LC connectors may be used by commercial businesses, governments, and data centers, transmitting gigabit Ethernet and video multimedia, as an example. In some embodiments, the duplex fiber optic adapters comprise low profiles and no mounting flanges for compact and efficient application.

Figure 1A:
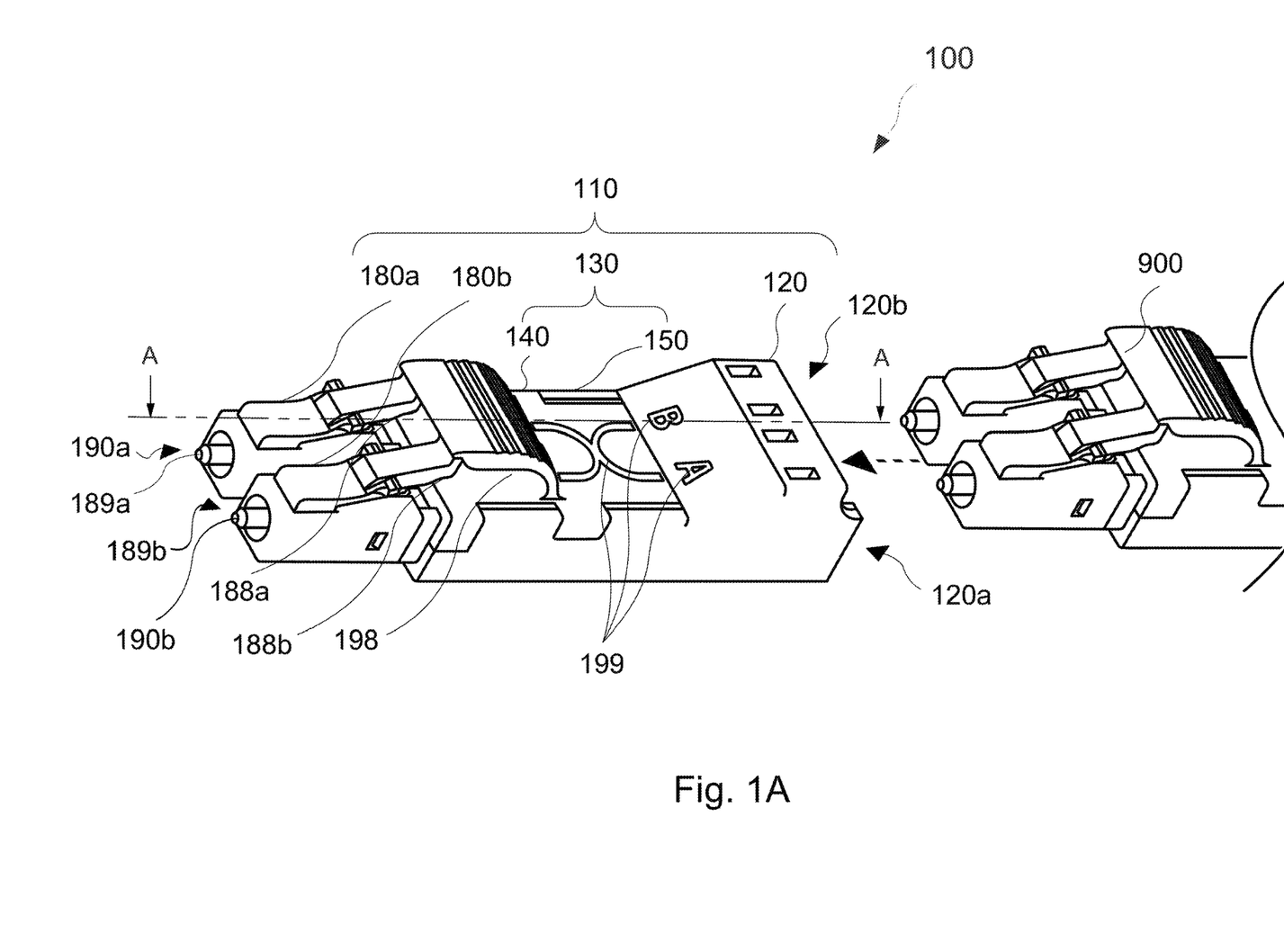
FIG. 1A is a schematic perspective view of a duplex fiber optic adapter, according to an example embodiment.
Figure 1B:
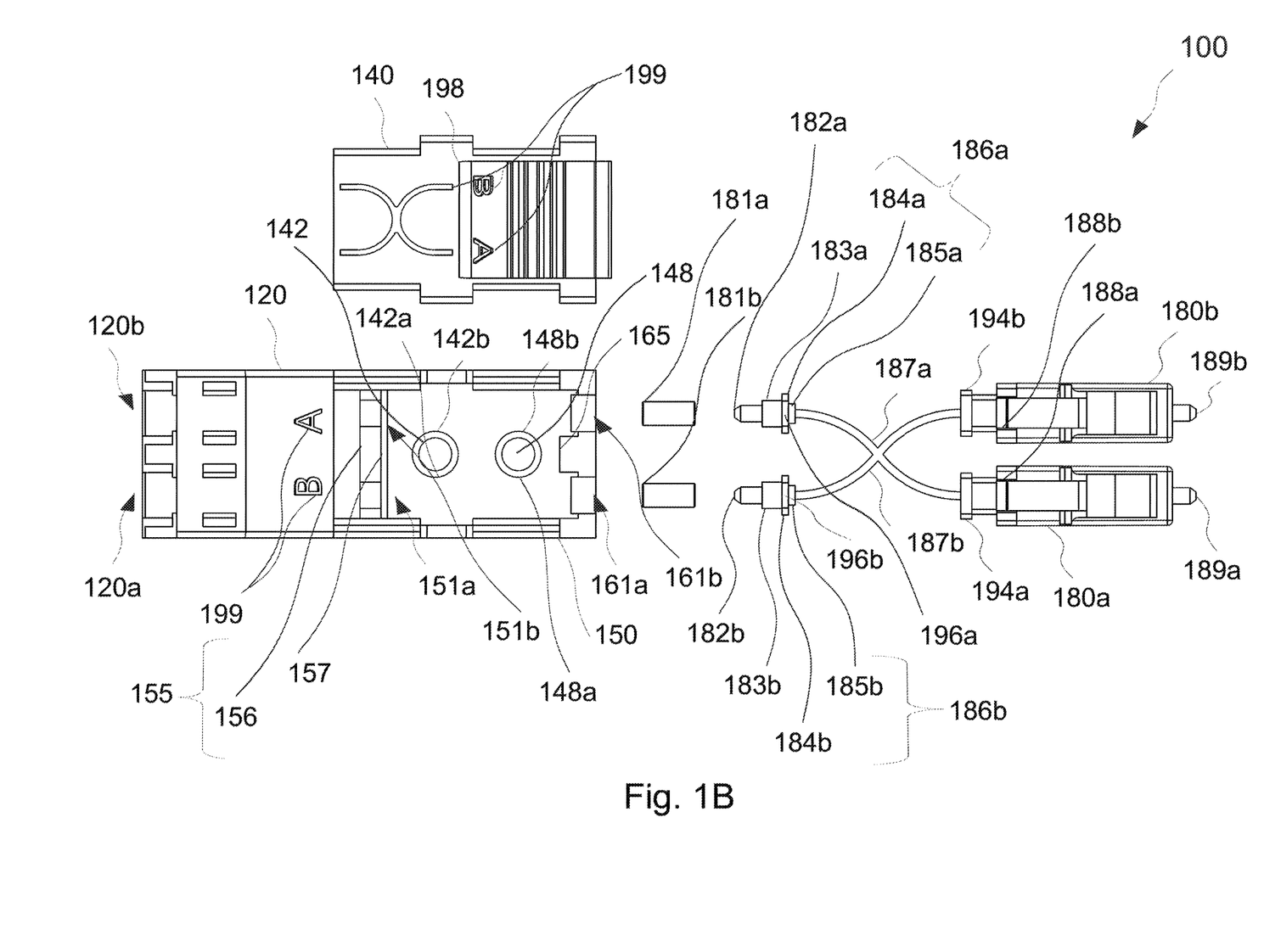
FIG. 1B is a schematic exploded view of the duplex fiber optic adapter of FIG. 1A, according to an example embodiment.
Figure 1C:
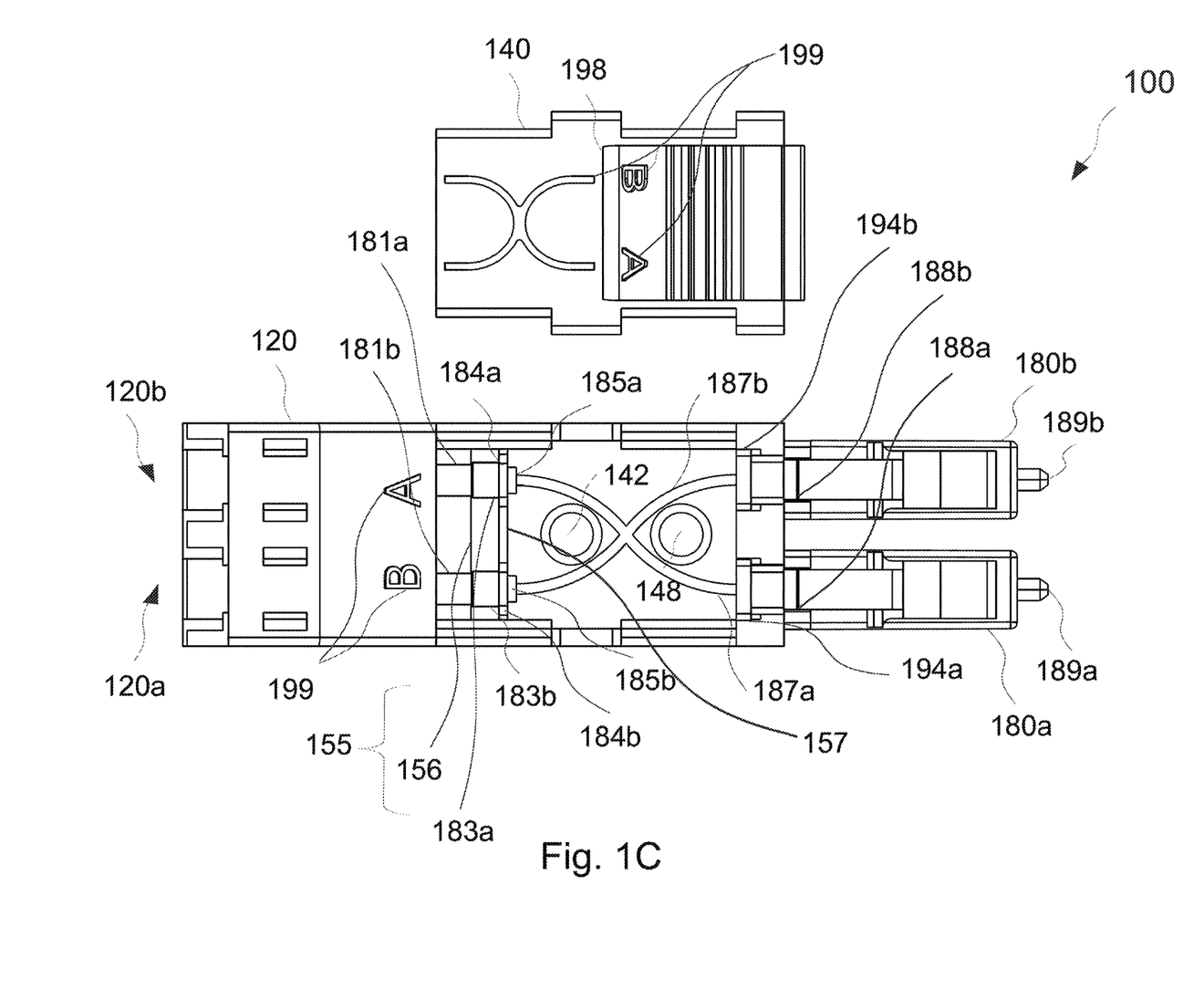
FIG. 1C is a schematic partially exploded view of the duplex fiber optic adapter of FIG. 1A, according to an example embodiment.

FIG. 1A is a schematic perspective view of a duplex fiber optic adapter, according to an example embodiment. FIG. 1B is a schematic exploded view of the duplex fiber optic adapter of FIG. 1A, according to an example embodiment. FIG. 1C is a schematic partially exploded view of the duplex fiber optic adapter of FIG. 1A, according to an example embodiment. Referring to FIGS. 1A to 1C, in an embodiment, a duplex fiber optic adapter 100, comprising a housing 110 is provided. The housing 110 comprises an integrated polarity reversal portion 130, a first fiber optic connector assembly 180$a$, a second fiber optic connector assembly 180$b$, and a receiving portion 120. The integrated polarity reversal portion 130 comprises a first body component 150 and a second body component 140 fixedly attached thereto. The second body component 140 may be fixedly attached and removed from the first body component 150 by corresponding snap-fit mechanisms; however, the embodiments are not limited thereto. Other mechanisms and configurations may be employed by those of ordinary skill in the relevant art for securing the second and first body components together.

The first and second body components 140, 150 form a first attachment opening 161$a$, 162$a$ and a second attachment opening 161$b$, 162$b$. The first fiber optic connector assembly 180$a$ comprises a first optic fiber assembly 190$a$ having a first coupling ferrule 189$a$, a first connecting ferrule 182$a$, and a first optic fiber 187$a$ attached therebetween. The second fiber optic connector assembly 190$b$ comprises a second optic fiber 187$b$ assembly having a second coupling ferrule 189$b$, a second connecting ferrule 182$b$, and a second optic fiber 187$b$ attached therebetween. The first fiber optic connector assembly 180$a$ is engaged and fixed in the first attachment opening 161$a$, 162$a$ and the second fiber optic connector assembly 185$b$ is engaged and fixed in the second attachment opening 161$b$, 162$b$, and are substantially parallel and of the same size and length.

The receiving portion 120 has a first port 120$a$ and a substantially parallel second port 120$b$ positioned therewithin. The first and second ports 120$a$, 120$b$ are configured to receive a pair of ferrules of a fiber optic connector 900 and through opposing ends, the first port 120$a$ is configured to receive the second connecting ferrule 182$b$ and the second port 120$b$ is configured to receive the first connecting ferrule 182$a$. An optical connection is established between the pair of ferrules of the fiber optic connector 900 and the second and first connecting ferrules 182$b$, 182$a$, respectively. The first port 120$a$ is substantially aligned and positioned on a same side as the first fiber optic connector assembly 180$a$ and the second port 120$b$ is substantially aligned and positioned on a same side as the second fiber optic connector assembly 185$b$.

When the fiber optic connector 900 is inserted into the adapter 100 and the first and second fiber optic connector assemblies 180$a$, 180$b$ are coupled to a mating fiber optic connector (not shown), latch clip assemblies 188$a$, 188$b$ of the fiber optic connector 900 are engaged within the receiving portion and the pair of ferrules is engaged in the first and second ports 120$a$, 120$b$, respectively and latch clip assemblies 188$a$, 188$b$ of the first and second fiber optic connector assemblies 180$a$, 180$b$ are engaged within the mating fiber optic connector and the first and second coupling ferrules 189$a$, 189$b$ are engaged in a pair of ports of the mating fiber optic connector, thereby establishing polarity reversal connection between the fiber optic connector 900 and mating fiber optic connector (not shown) via the adapter 100.

In some embodiments, the integrated polarity reversal portion 130 further comprises a rearward guiding structure 142 and a frontward guiding structure 148. The rearward guiding structure 142 is substantially conical and has a first rearward structure surface 142a and a second rearward structure surface 142b opposite therefrom. The rearward guiding structure 142 is positioned and aligned centrally and off centered toward the first and second port 120a, 120b sides. The frontward guiding structure 148 is substantially conical and the same size as the rearward guiding structure 142 and has a first frontward structure surface 148a and a second frontward structure surface 142b opposite therefrom. The frontward guiding structure 148 is positioned and aligned centrally and off centered toward the first and second attachment openings 161a, 162a, 161b, 162b sides. The first optic fiber 187a curves around the first frontward structure surface 148a and second rearward structure surface 142b and the second optic fiber 187b curves around the second frontward structure surface 148b and first rearward structure surface 142a, stabilizing and preventing kinking and entanglement of the first and second optic fiber 187bs. The rearward and frontward guiding structures 142, 148 are substantially the same size and conical; however, those of ordinary skill in the relevant art may readily appreciate that other sizes and shapes may be employed, and in any combination. As long as first optic fiber 187a may curve around the first frontward structure surface 148a and second rearward structure surface 142b and the second optic fiber 187b may curve around the second frontward structure surface 148b and first rearward structure surface 142a, stabilizing and preventing kinking and entanglement of the first and second optic fiber 187bs.

In some embodiments, the integrated polarity reversal portion 130 further comprises an internal fixing structure 155 positioned near to the first and second ports 120a, 120b and a proximal fixing structure 165 integrated with the first and second attachment openings 161a, 162a, 161b, 162b, both, extending across a width of the integrated polarity reversal portion 130. The internal fixing structure 155 is configured to fixedly secure and prevent movement of the second and first connecting ferrules 182b, 182a, respectively, and the proximal fixing structure 165 is configured to fixedly secure and prevent movement of the first and second fiber optic connector assemblies 180a, 180b.

In some embodiments, the first and second fiber optic connector assemblies 180a, 180b each comprise a neck flange end 194a, 194b. Each neck flange end 194a, 194b is configured to correspond to and be fixedly secured in the proximal fixing structure 165. A size and a shape of each of the neck flange end 194a, 194bs is substantially the same as a size and the shape of the proximal fixing structure 165; however, the embodiments are not limited thereto. Other sizes and shapes may be employed for the proximal fixing structure 165, as long as each neck flange end 194a, 194b may be fixedly secured in the proximal fixing structure 165.

In some embodiments, the second and first connecting ferrules 182b, 182a, respectively, each comprise a stabilizing component 186b, 186a fixedly attached therearound, each stabilizing component 186b, 186a including an integrated sleeve 183b, 183a having a distal neck 185b, 185a and a collar 184b, 184a positioned therebetween, whereby each stabilizing component 186b, 186a is configured to correspond to and be fixedly secured in the internal fixing structure 155. The stabilizing components 186b, 186a may be made of metal, ceramic, or composite materials.

Figure 2A:
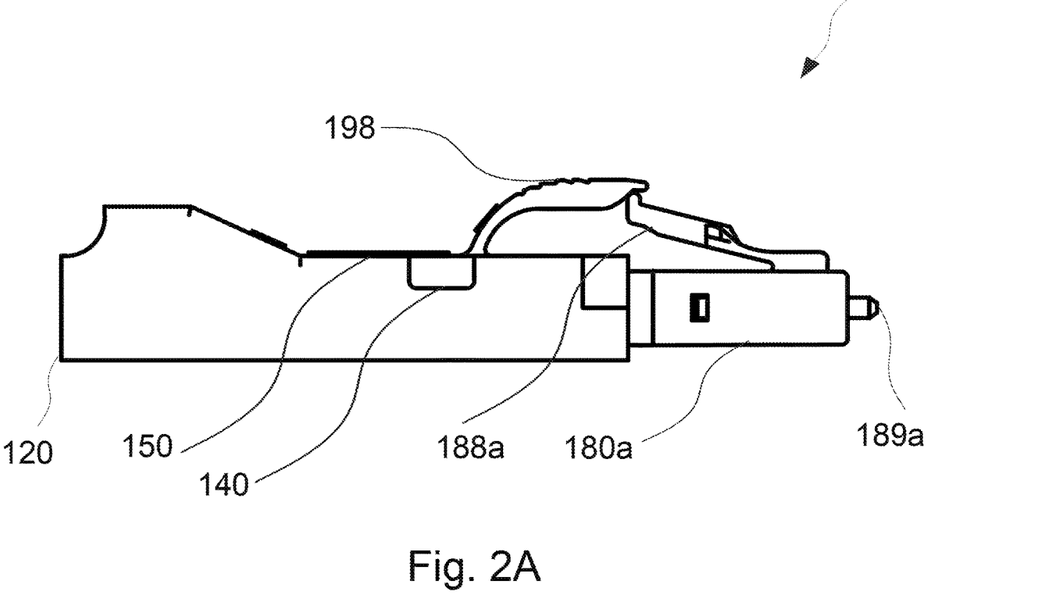
FIG. 2A is a schematic perspective side view of the duplex fiber optic adapter of FIG. 1A, according to an example embodiment.
Figure 2B:
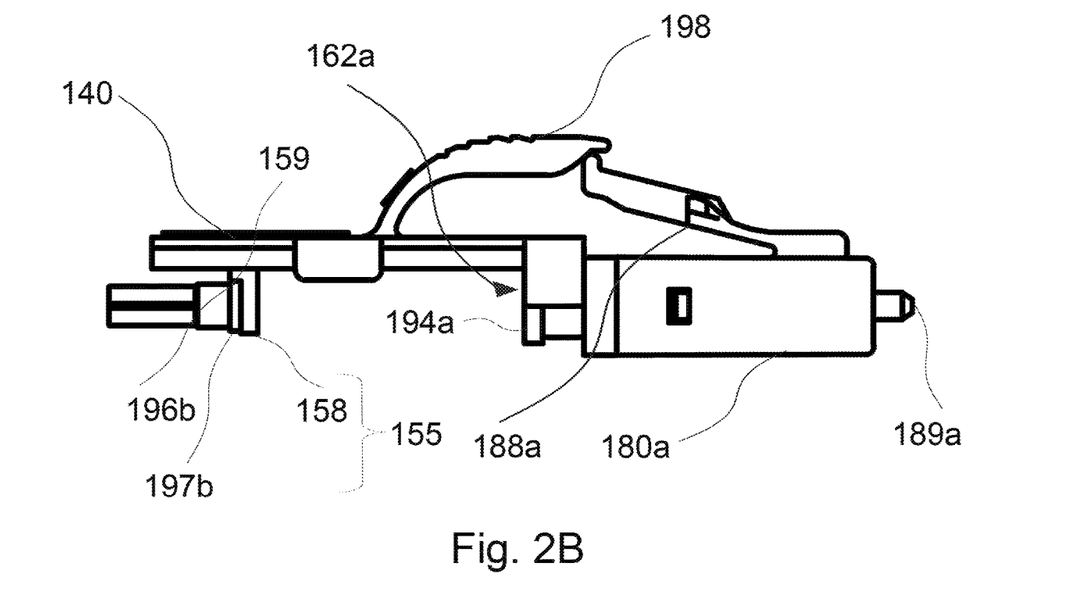
FIG. 2B is a schematic perspective side view of the duplex fiber optic adapter of FIG. 2a without an integrated polarity reversal portion, receiving portion, and optic fibers, according to an example embodiment.
Figure 3A:
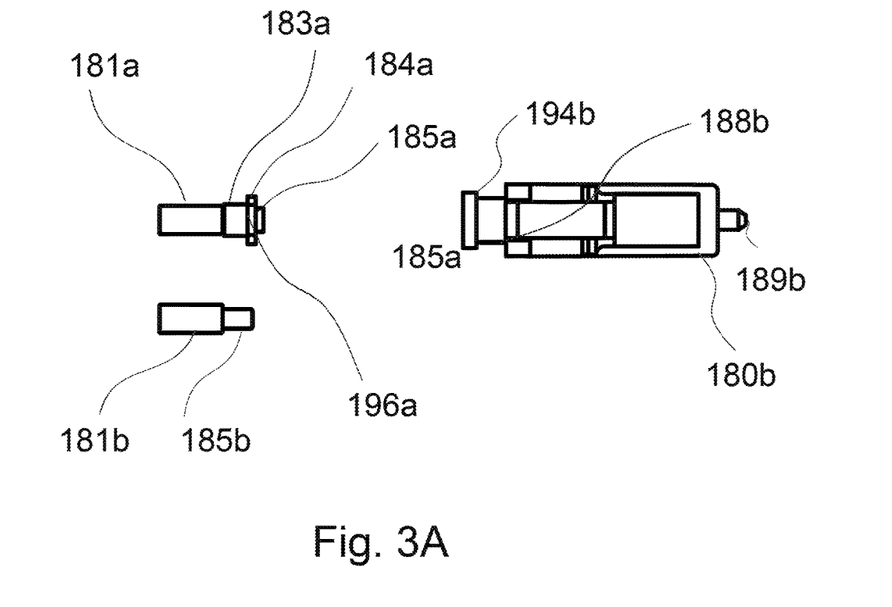
FIG. 3A is a schematic perspective view of a second fiber optic connector assembly, stabilizing component and an alignment sleeve of a first connecting ferrule, and an alignment sleeve and a connecting ferrule of a second connecting ferrule of the duplex fiber optic adapter of FIG. 1A, according to an example embodiment.
Figure 3B:
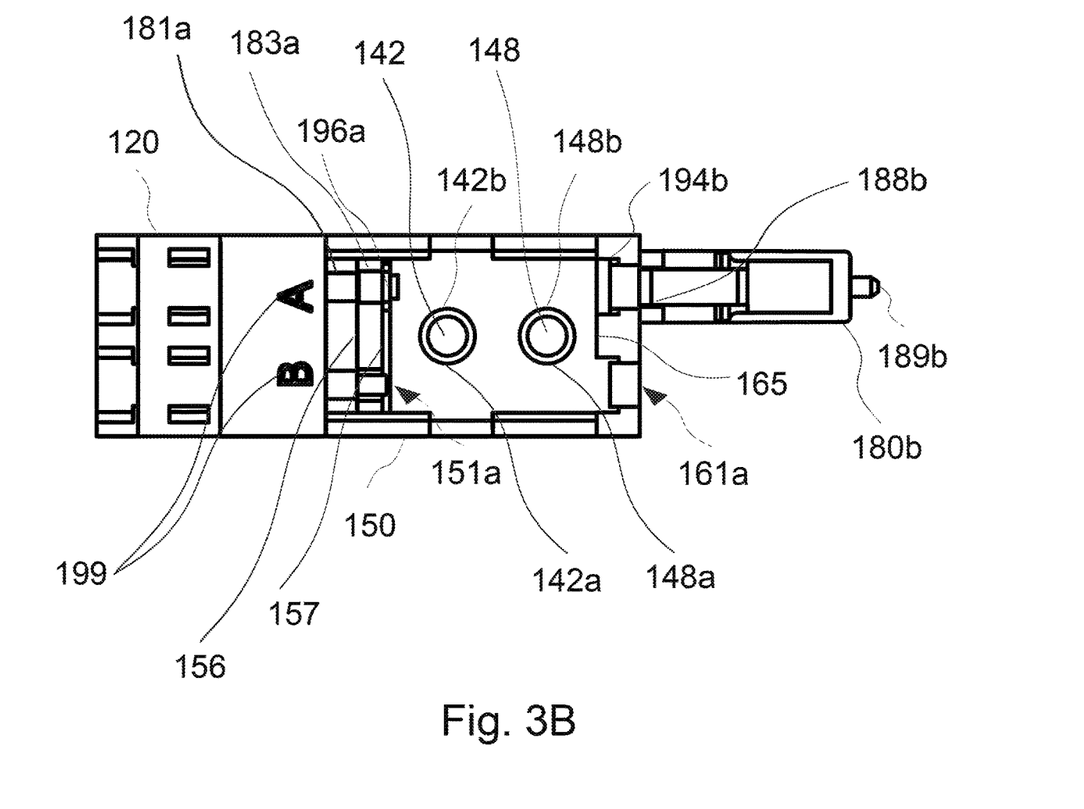
FIG. 3B is a schematic perspective view of the components of FIG. 3A assembled to the duplex fiber optic adapter of FIG. 3A, according to an example embodiment.
Figure 4:
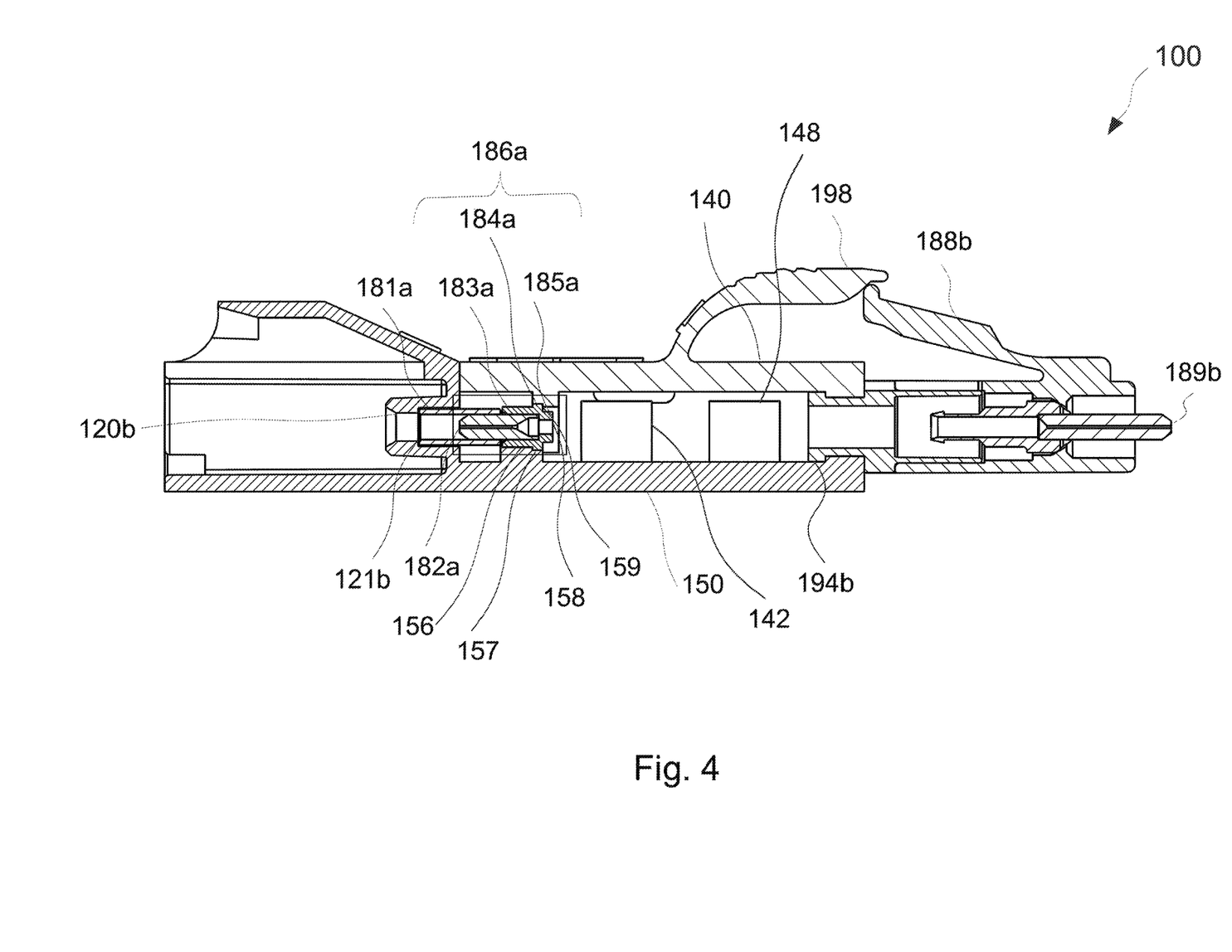
FIG. 4 is a schematic cross-sectional view of the duplex fiber optic adapter of FIG. 1A along line A-A in FIG. 1A, according to an example embodiment.

FIG. 2A is a schematic perspective side view of the duplex fiber optic adapter of FIG. 1A, according to an example embodiment. FIG. 2B is a schematic perspective side view of the duplex fiber optic adapter of FIG. 2a without an integrated polarity reversal portion, receiving portion, and optic fibers, according to an example embodiment. FIG. 3A is a schematic perspective view of a second fiber optic connector assembly, stabilizing component and an alignment sleeve of a first connecting ferrule, and an alignment sleeve and a connecting ferrule of a second connecting ferrule of the duplex fiber optic adapter of FIG. 1A, according to an example embodiment. FIG. 3B is a schematic perspective view of the components of FIG. 3A assembled to the duplex fiber optic adapter of FIG. 3A, according to an example embodiment. FIG. 4 is a schematic cross-sectional view of the duplex fiber optic adapter of FIG. 1A along line A-A in FIG. 1A, according to an example embodiment. Referring to FIGS. 2A to 4, and referring to FIGS. 1A to 1C, in some embodiments, the internal fixing structure 155 comprises a first fixing component 156 having a first stepped structure 157, integrated with the first body component 150 and a second fixing component 158 having a second stepped structure 159, opposing the first stepped structure 157, integrated with the second body component 140, forming a first fixing opening 151a and a second fixing opening 151b. The second and first connecting ferrules 182b, 182a, respectively, correspond to and are engaged and fixed in the first and second fixing openings 151a, 151b, respectively. The first stepped structure 157 fixedly engages with each of corresponding surfaces of the integrated sleeves 183b, 183a and collars 184b, 184a of the stabilizing components 186b, 186a, respectively, and the second step structure 159 fixedly engages with each of corresponding opposing surfaces of the collars 197b, 197a of the stabilizing components 186b, 186a, opposite from the first stepped structure 157, and from the distal neck 185b, 185a sides of the collars, respectively, preventing x, y and z axis movement of the stabilizing components 186b, 186a, respectively.

In some embodiments, each of corresponding surfaces of the collars 196b, 196a and each of corresponding opposing surfaces of the collars 197b, 197a are flat surfaces, whereby each of the corresponding surfaces rests flush on a portion of a lower step of the first stepped structure 157 and each of the corresponding opposing surfaces rests flush on a portion of a lower step of the second stepped structure 159. The depth and the width of the first and second stepped structures 157, 159 is equal to the thicknesses of the collars 184b, 184a from the integrated sleeves 183b, 183a to the corresponding surfaces of the collars 196b, 196a and corresponding opposing surfaces of the collars 197b, 197a, respectively, and the widths of each collar 184b, 184a, respectively, preventing rotational movement of the stabilizing components 186b, 186a, respectively.

In some embodiments, the second and first connecting ferrules 182b, 182a, respectively, each further comprise an alignment sleeve 181b, 181a fixedly attached to the stabilizing components 186b, 186a, respectively, opposite the distal neck 185b, 185a. The alignment sleeves 181b, 181a are substantially conical, and a length of each alignment sleeve 181b, 181a is greater than a length of each connecting ferrule 182b, 182a extended from the stabilizing components 186b, 186a, respectively. The portions of the alignment sleeves 181b, 181a not encompassing each connecting ferrules 182b, 182a, respectively, is correspondingly slide-fit engaged to an inner stop ledge 121a, 121b in the first and second ports 120a, 120b, respectively, stabilizing and aligning optical fiber cores of the fiber optic connector 900 to the second and first connecting ferrules 182b, 182a, respectively. The alignment sleeve 181b, 181a may be made of metal, ceramic, or composite materials.

In some embodiments, the duplex fiber optic adapter 100 further comprises identification labels 199 on at least one visible outer surface thereof. The visible outer side is the side where latch 188*a*, 188*b* and trigger mechanisms 198 for removal are positioned. The identification labels 199 comprise a letter B in alignment with the first port 120*a* and a letter B in alignment with the second fiber optic connector assembly 185*b*, a letter A in alignment with the second port 120*b* and a letter A in alignment with the first fiber optic connector assembly 180*a*, and an X-like polarity reversal label between the letter B and letter A in alignment with the first and second ports 120*a*, 120*b*, respectively, and the letter A and letter B in alignment with the first and second fiber optic connector assemblies 180*a*, 180*b*, respectively. The identification labels 199 may comprise other letters, words, symbols, geometric shapes etc. or any combination thereof, and the embodiments are not limited thereto.

Features of the latches 188*a*, 188*b* and trigger mechanisms 198 may interact with the receiving portions and first and second fiber optic connector assemblies 180*a*, 180*b* for engagement of the duplex fiber optic adapter 100 to the mating fiber optic connector (not shown), following engagement of the fiber optic connector 900 to the duplex fiber optic adapter 100. Retention features on and within the receiving portions may interact with the latch features of the fiber optic connector 900 and a trigger feature of the trigger mechanism 198, integrally formed on an outside of the second body component 140, may interact with the latch features of the first and second fiber optic connector assemblies 180*a*, 180*b*; however, the embodiments are not limited thereto. Other known mechanisms and arrangements may be employed by those of ordinary skill in the relevant art for engagement of the fiber optic connector 900 to the duplex fiber optic adapter 100 and engagement of the duplex fiber optic adapter 100 to the mating fiber optic connector (not shown), and the embodiments are not limited thereto.

In an embodiment of a fiber optic connector 900 system for providing a reversal polarity connection between fiber optic connectors via a duplex fiber optic adapter 100, the system further comprises an LC duplex fiber optic connector. The duplex fiber optic adapter 100 in the system is as described in detail in the embodiments, and for sake of brevity, will not repeated hereafter.

In an embodiment, a method of changing a polarity connection between fiber optic connectors via a duplex fiber optic adapter 100 is provided. The method comprises engaging the fiber optic connector 900 to the duplex fiber optic adapter 100 and engaging the adapter 100 to the mating, fiber optic connector (not shown). The duplex fiber optic adapter 100 of the method is as described in detail in the embodiments, and for sake of brevity, will not repeated hereafter.

The embodiment of the method of changing the polarity connection between fiber optic connectors via the duplex fiber optic adapter 100 is fast, efficient, and mistake-free. No disassembly is required, no adjustment to connectors is required, and all that is required is engagement of the fiber optic connector 900 to the duplex fiber optic adapter 100 and engagement of the adapter 100 to the mating fiber optic connector (not shown) for polarity reversal optical connection. On one end, the pair of ferrules of the fiber optic connector 900 can only be engaged into the receiving portion 120 in a single orientation. On an opposing end, the second and first fiber optic connector assemblies can only be engaged into a pair of receiving structures of the mating fiber optic connector (not shown) in a single orientation, for a clear and obvious viewable orientation and label understanding.

In some embodiments, the receiving portion 120 and first body component 150 is integrally formed and the second body component 140 is formed and both are made of a suitable thermoplastic or thermoset polymer material by methods known by those skilled in the relevant art. Those of skill in the relevant art may readily appreciate that the duplex fiber optic adapter 100 may be formed in more than two portions and may be made of more than one material and assembled thereafter, and the embodiments are not limited thereto.

In some embodiments, the optic fiber may be any suitable optic fiber cable or cables known by those of ordinary skill in the relevant art and are not limited. By way of example, the optic fiber may include two unbuffered optical fibers generally surrounded by one or more strength elements and a cable jacket; however, other variations of the fiber optic cable may include buffered optical fibers and/or eliminate the strength elements or jacket.

With a rise in online and offline connectivity, supporting infrastructural technologies are proliferating in advancement and innovation. Fiber optics enables high-speed data transfer in both small and long-range communications. It also serves as a medium to cope with increasing bandwidth requirements associated with broadband services, network operators, and broadband connection providers.

The exploding demand for data volumes and data rates have resulted in existing data centers being upgraded and new data centers begin built. Often, there are multiple adapters and optic fiber segments connected in a data center, with the polarity of the connectors used changing not just once, but, several times during deployment. The problem of poor fiber connection alignment and/or crossing of fiber optic cables during installation have increased, whereby a transmit signal (Tx) port and receiver (Rx) port of an LC duplex fiber optic connector is mistakenly not connected to a receiver (Rx) port and a transmit signal (Tx) port of a corresponding LC duplex fiber optic connector, respectively.

In the embodiments, duplex fiber optic adapters, comprising a housing having an integrated polarity reversal portion and a receiving portion are provided. The integrated polarity reversal portion comprises a first fiber optic connector assembly, including a first optic fiber assembly having a first coupling ferrule, a first connecting ferrule, and a first optic fiber attached therebetween, and a second fiber optic connector assembly, including a second optic fiber assembly having a second coupling ferrule, a second connecting ferrule, and a second optic fiber attached therebetween. The receiving portion comprises first and second ports, configured to receive a pair of ferrules of a fiber optic connector and through opposing ends, the first port is configured to receive the second connecting ferrule and the second port is configured to receive the first connecting ferrule. Following, engagement, polarity reversal optical connection is established between the fiber optic connector and a mating fiber optic connector via the adapter.

The embodiments of the duplex fiber optic adapter 100 allow for cabling infrastructure in data centers, as an example, to be even more reliable, easier to install, modular and flexible, to accommodate changes and data center growth. When switching of polarities is required, no re-termination is needed. Thus, time is saved, risk of human error is mitigated, and no special tool is required for completion. Via the structures in the integrated polarity reversal portion tight fittingly corresponding to and securing the neck flange ends of the first and second fiber optic connector assemblies, respectively, and distal necks and collars of the second and first connecting ferrules, respectively, all that is required for the switching of polarities is for engagement of the fiber optic connector to the adaptor 100 and engagement of the adaptor 100 to the mating fiber optic connector, mitigating non-precise alignment, wrong connections, signal degradation, damaged equipment or devices, or signals not being transmitted. Alignment between the pair of ferrules of the fiber optic connector and the second and first connecting ferrules is assured via the slide-fit engagement of the alignment sleeves in the first and second ports to the inner stop ledges, respectively. Also, via the rearward and frontward guiding structures, kinking or entanglement of optic fibers are prevented, thus, further mitigating the risk of non-precise alignment of the optical fiber cores, signal degradation, damaged equipment or devices, or signals not being transmitted. Additionally, as the removable trigger mechanisms of the adapter 100, fiber optic connector, and mating fiber optic connector are positioned on a same visible side, and via the identification labels also positioned on at least one visible outer surface of the adapter 100, an installer will only need to inspect a visible side of the adapter 100 to assure desired polarity connection, also saving installation time and risk of human error.

The presently disclosed inventive concepts are not intended to be limited to the embodiments shown herein, but are to be accorded their full scope consistent with the principles underlying the disclosed concepts herein. Directions and references to an element, such as "up," "down,", "upper, "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A duplex fiber optic adapter, comprising:
   a housing comprising:
      an integrated polarity reversal portion comprising a first body component and a second body component fixedly attached to the first body component, forming a first attachment opening and a second attachment opening, a first fiber optic connector assembly, engaged and fixed in the first attachment opening, including a first optic fiber assembly having a first coupling ferrule, a first connecting ferrule, and a first optic fiber attached therebetween and a second fiber optic connector assembly, engaged and fixed in the second attachment opening, including a second optic fiber assembly having a second coupling ferrule, a second connecting ferrule, and a second optic fiber attached therebetween; and
      a receiving portion having a first port and a second port positioned therewithin, the first and second ports are configured to receive a pair of ferrules of a fiber optic connector and through opposing ends, the first port is configured to receive the second connecting ferrule and the second port is configured to receive the first connecting ferrule, whereby an optical connection is established therebetween and wherein the first port is aligned and positioned on a same side as the first fiber optic connector assembly and the second port is aligned and positioned on a same side as the second fiber optic connector assembly,
   whereby when the fiber optic connector is inserted into the adapter and the first and second fiber optic connector assemblies are coupled to a mating fiber optic connector, latch clip assemblies of the fiber optic connector are engaged within the receiving portion and the pair of ferrules is engaged in the first and second ports, respectively and latch clip assemblies of the first and second fiber optic connector assemblies are engaged within the mating fiber optic connector and the first and second coupling ferrules are engaged in a pair of ports of the mating fiber optic connector, thereby establishing polarity reversal connection between the fiber optic connector and mating fiber optic connector via the adapter.

2. The duplex fiber optic adapter of claim 1, wherein the integrated polarity reversal portion further comprises a rearward guiding structure having a first rearward structure surface and a second rearward structure surface opposite therefrom, positioned and aligned centrally and off centered toward the first and second port sides, and a frontward guiding structure having a first frontward structure surface and a second frontward structure surface opposite therefrom, positioned and aligned centrally and off centered toward the first and second attachment openings side, whereby the first optic fiber curves around the first frontward structure surface and second rearward structure surface and the second optic fiber curves around the second frontward structure surface and first rearward structure surface, stabilizing and preventing kinking and entanglement of the first and second optic fibers.

3. The duplex fiber optic adapter of claim 1, wherein the integrated polarity reversal portion further comprises an internal fixing structure positioned near to the first and second ports and a proximal fixing structure integrated with the first and second attachment openings, whereby the internal fixing structure is configured to fixedly secure and prevent movement of the second and first connecting ferrules, respectively, and the proximal fixing structure is configured to fixedly secure and prevent movement of the first and second fiber optic connector assemblies.

4. The duplex fiber optic adapter of claim 3, wherein the first and second fiber optic connector assemblies each comprise a neck flange end, whereby each neck flange end is configured to correspond to and be fixedly secured in the proximal fixing structure.

5. The duplex fiber optic adapter of claim 3, wherein the first and second connecting ferrules each comprise a stabilizing component fixedly attached therearound, each stabilizing component including an integrated sleeve having a distal neck and a collar positioned therebetween, whereby each stabilizing component is configured to correspond to and be fixedly secured in the internal fixing structure.

6. The duplex fiber optic adapter of claim 5, wherein the internal fixing structure comprises a first fixing component having a first stepped structure, integrated with the first body component and a second fixing component having a second stepped structure, opposing the first stepped structure, integrated with the second body component, forming a first fixing opening and a second fixing opening, whereby the first and second connecting ferrules correspond to and are engaged and fixed in the second and first fixing openings, respectively, and whereby the first stepped structure fixedly engages with each of corresponding surfaces of the integrated sleeves and collars of the stabilizing components, respectively, and the second step structure fixedly engages with each of corresponding opposing surfaces of the collars of the stabilizing components, opposite from the first stepped structure, and from the distal neck sides of the collars, respectively, preventing x, y and z axis movement of the stabilizing component.

7. The duplex fiber optic adapter of claim 6, wherein each of corresponding surfaces of the collars and each of corresponding opposing surfaces of the collars are flat surfaces, whereby each of the corresponding surfaces rests flush on a portion of a lower step of the first stepped structure and each of the corresponding opposing surfaces rests flush on a portion of a lower step of the second stepped structure, and whereby the depth and the width of the first and second stepped structures is equal to the thicknesses of the collars from the integrated sleeves to the corresponding surfaces of the collars and corresponding opposing surfaces of the collars, respectively, and the widths of each collar, respectively, preventing rotational movement of the stabilizing component.

8. The duplex fiber optic adapter of claim 5, wherein the first and second connecting ferrules each further comprise an alignment sleeve fixedly attached to the stabilizing components, respectively, opposite the distal neck, whereby a length of each alignment sleeve is greater than a length of each connecting ferrule extended from the stabilizing component, and whereby the portions of the alignment sleeves not encompassing each connecting ferrule, respectively, is correspondingly slide-fit engaged to an inner stop ledge in the first and second ports, respectively, stabilizing and aligning optical fiber cores of the fiber optic connector to the second and first connecting ferrules, respectively.

9. The duplex fiber optic adapter of claim 1, wherein the duplex fiber optic adapter further comprises identification labels on at least one visible outer surface thereof, whereby the visible outer side is the side where removable trigger mechanisms are positioned, and wherein the identification labels comprise a letter B in alignment with the first port and a letter B in alignment with the second fiber optic connector assembly, a letter A in alignment with the second port and a letter A in alignment with the first fiber optic connector assembly, and an X-like polarity reversal label between the letter B and letter A in alignment with the first and second ports, respectively, and the letter A and letter B in alignment with the first and second fiber optic connector assemblies, respectively.

10. A fiber optic connector system for providing a reversal polarity connection between fiber optic connectors via a duplex fiber optic adapter, comprising:
   a fiber optic connector; and
   a housing comprising:
      an integrated polarity reversal portion comprising a first body component and a second body component fixedly attached to the first body component, forming a first attachment opening and a second attachment opening, a first fiber optic connector assembly, engaged and fixed in the first attachment opening, including a first optic fiber assembly having a first coupling ferrule, a first connecting ferrule, and a first optic fiber attached therebetween, and a second fiber optic connector assembly, engaged and fixed in the second attachment opening, including a second optic fiber assembly having a second coupling ferrule, a second connecting ferrule, and a second optic fiber attached therebetween; and
   a receiving portion having a first port and a second port positioned therewithin, the first and second ports are configured to receive a pair of ferrules of the fiber optic connector and through opposing ends, the first port is configured to receive the second connecting ferrule and the second port is configured to receive the first connecting ferrule, whereby an optical connection is established therebetween and the first port is aligned and positioned on a same side as the first fiber optic connector assembly and the second port is aligned and positioned on a same side as the second fiber optic connector
   whereby when the fiber optic connector is inserted into the adapter and the first and second fiber optic connector assemblies are coupled to a mating fiber optic connector, latch clip assemblies of the fiber optic connector are engaged within the receiving portion and the pair of ferrules is engaged in the first and second ports, respectively and latch clip assemblies of the first and second fiber optic connector assemblies are engaged within the mating fiber optic connector and the first and second coupling ferrules are engaged in a pair of ports of the mating fiber optic connector, thereby establishing polarity reversal connection between the fiber optic connector and mating fiber optic connector via the adapter.

11. The fiber optic connector system of claim 10, wherein the integrated polarity reversal portion further comprises a rearward guiding structure having a first rearward structure surface and a second rearward structure surface opposite therefrom, positioned and aligned centrally and off centered toward the first and second port sides, and a frontward guiding structure having a first frontward structure surface and a second frontward structure surface opposite therefrom, positioned and aligned centrally and off centered toward the first and second attachment openings side, whereby the first optic fiber curves around the first frontward structure surface and second rearward structure surface and the second optic fiber curves around the second frontward structure surface and first rearward structure surface, stabilizing and preventing kinking and entanglement of the first and second optic fibers.

12. The fiber optic connector system of claim 10, wherein the integrated polarity reversal portion further comprises an internal fixing structure positioned near to the first and second ports and a proximal fixing structure integrated with the first and second attachment openings, whereby the internal fixing structure is configured to fixedly secure and prevent movement of the second and first connecting ferrules, respectively, and the proximal fixing structure is configured to fixedly secure and prevent movement of the first and second fiber optic connector assemblies.

13. The fiber optic connector system of claim 12, wherein the first and second fiber optic connector assemblies each comprise a neck flange end, whereby each neck flange end is configured to correspond to and be fixedly secured in the proximal fixing structure.

14. The fiber optic connector system of claim 12, wherein the first and second connecting ferrules each comprise a stabilizing component fixedly attached therearound, each stabilizing component including an integrated sleeve having a distal neck and a collar positioned therebetween, whereby each stabilizing component is configured to correspond to and be fixedly secured in the internal fixing structure.

15. The fiber optic connector system of claim 14, wherein the internal fixing structure comprises a first fixing component having a first stepped structure, integrated with the first body component and a second fixing component having a second stepped structure, opposing the first stepped structure, integrated with the second body component, forming a first fixing opening and a second fixing opening, whereby the first and second connecting ferrules correspond to and are engaged and fixed in the second and first fixing openings, respectively, and whereby the first stepped structure fixedly engages with each of corresponding surfaces of the integrated sleeves and collars of the stabilizing components, respectively, and the second step structure fixedly engages with each of corresponding opposing surfaces of the collars of the stabilizing components, opposite from the first stepped structure, and from the distal neck sides of the collars, respectively, preventing x, y and z axis movement of the stabilizing component.

16. The fiber optic connector system of claim 15, wherein each of corresponding surfaces of the collars and each of corresponding opposing surfaces of the collars are flat surfaces, whereby each of the corresponding surfaces rests flush on a portion of a lower step of the first stepped structure and each of the corresponding opposing surfaces rests flush on a portion of a lower step of the second stepped structure, and whereby the depth and the width of the first and second stepped structures is equal to the thicknesses of the collars from the integrated sleeves to the corresponding surfaces of the collars and corresponding opposing surfaces of the collars, respectively, and the widths of each collar, respectively, preventing rotational movement of the stabilizing component.

17. The fiber optic connector system of claim 14, wherein the first and second connecting ferrules each further comprise an alignment sleeve fixedly attached to the stabilizing components, respectively, opposite the distal neck, whereby a length of each alignment sleeve is greater than a length of each connecting ferrule extended from the stabilizing component, and whereby the portions of the alignment sleeves not encompassing each connecting ferrule, respectively, is correspondingly slide-fit engaged to an inner stop ledge in the first and second ports, respectively, stabilizing and aligning optical fiber cores of the fiber optic connector to the second and first connecting ferrules, respectively.

18. The fiber optic connector system of claim 10, wherein the duplex fiber optic adapter further comprises identification labels on at least one visible outer surface thereof, whereby the visible outer side is the side where removable trigger mechanisms are positioned, and wherein the identification labels comprise a letter B in alignment with the first port and a letter B in alignment with the second fiber optic connector assembly, a letter A in alignment with the second port and a letter A in alignment with the first fiber optic connector assembly, and an X-like polarity reversal label between the letter B and letter A in alignment with the first and second ports, respectively, and the letter A and letter B in alignment with the first and second fiber optic connector assemblies, respectively.

* * * * *